United States Patent [19]

Inaba et al.

[11] 3,951,859

[45] Apr. 20, 1976

[54] MOLECULAR SIEVING PARTICLE AND PREPARATION THEREOF

[75] Inventors: Yoshihito Inaba; Masataka Morishita; Mitsuru Fukushima, all of Shizuoka, Japan

[73] Assignee: Toyo Jozo Co., Ltd., Japan

[22] Filed: Dec. 28, 1973

[21] Appl. No.: 429,677

[30] Foreign Application Priority Data
Dec. 30, 1972 Japan.................................. 47-2821
Nov. 20, 1973 Japan.............................. 48-131080

[52] U.S. Cl................................. 252/430; 252/428
[51] Int. Cl.²......................................... B01J 31/06
[58] Field of Search..................... 252/428, 430, 448

[56] References Cited
UNITED STATES PATENTS

| | | | |
|---|---|---|---|
| 2,876,133 | 3/1959 | Iler et al. ........................ | 252/430 X |
| 2,933,455 | 4/1960 | Doying............................... | 252/428 |
| 3,424,588 | 1/1969 | Dohman et al. ................. | 252/430 X |
| 3,442,819 | 5/1969 | Herbert............................... | 252/428 |
| 3,737,337 | 6/1973 | Schnoring et al............... | 252/448 X |

Primary Examiner—Patrick P. Garvin
Attorney, Agent, or Firm—Craig & Antonelli

[57] ABSTRACT

A novel molecular sieving particle containing adsorbent powders dispersed in matrix of micro-porous polymer gels is prepared by dispersing adsorbent powders into a polymeric material solution dissolved in a solvent, then emulsifying the thus prepared dispersion into a vehicle having a boiling point higher than that of the solvent and finally removing the solvent by evaporation. This molecular sieving particle has excellent molecular sieving effect as well as excellent adsorption capacity, and applicable in various applications.

14 Claims, No Drawings

MOLECULAR SIEVING PARTICLE AND PREPARATION THEREOF

This invention relates to a novel molecular sieving particle and a method for producing same. More particularly, this invention relates to a molecular sieving particle, containing adsorbents dispersed in the matrix of micro-porous polymer gels.

Heretofore, adsorbents, particularly activated carbon, have been known to have excellent adsorption capacity. For improvement of adsorption capacity of activated carbon, surface area per unit weight is increased. As the result, activated carbon is conventionally used in the form of very fine powders. This, however, causes inconveniences in handling because fine powders are easily floated in the air and also liable to cause clogging of filtrating apparatus when activated carbon is separated after it is used. In order to overcome the drawback of fine powders, the activated carbon in the form of granules is proposed. Various methods are known for preparation of activated carbon granules and several activated carbon granules are commercially available. Some of these activated carbon granules are known to exhibit molecular sieving effect, although their activity is deteriorated as compared with that of fine powdery activated carbon. For example, carbonized products obtained from pyrolysis (at 800° to 1200° C) of activated carbon with polymers such as vinylidene chloride-vinyl chloride copolymer (Saran) or vinyl chloride polymer are reported to show molecular sieving effect (Emmett, P. H., Chem. Rev. 43, 69, 1948). However, molecular sieving effect of these activated carbon granules are such that it is effective only for low molecular weight compounds having at most 150 of molecular weight and a size between 4 and 6 angstrom in molecular size. Hence, they are applicable only for separation of gaseous components in petroleum chemistry. Furthermore, molecular sieving effect of the known activated carbon granules is insufficient to accomplish a clear sieving separation. Accordingly, they cannot be utilized for separation or purification of antibiotics, pigments, nucleic acids, proteins, enzymes and the like or treatment of wasted liquid wherein removal of organic compounds is required.

The object of the present invention is to provide a novel molecular sieving particle having excellent molecular sieving effect as well as excellent adsorption capacity and a process for producing said molecular sieving particle.

According to the present invention, a molecular sieving particle, comprising adsorbents dispersed in the matrix of micro-porous polymer gels, is provided.

As adsorbents to be used in the present invention, powders of activated carbon, alumina, silica gel, celite, bentonite, ion-exchange resin, calcium phosphate gel, and chelate resin may be mentioned as suitable examples. Any other adsorbent may be used so long as it has adsorption capacity.

The molecular sieving agent of the present invention has specific structure wherein adsorbent powders are dispersed in the matrix of micro-porous polymer gels. Molecular sieving effect of the molecular sieving particle of the present invention is construed to be ascribable to this structure. Micropores present throughout the matrix function as sieve. In other words, they permit permeation of a substance having a molecular size smaller than the size of micro-pores, thereby allowing sufficient contact with adsorbent powders dispersed throughout the matrix, while they bar penetration of a substance having a molecular size larger than that of the micro-pores into the matrix, thereby leaving such a substance detached from the adsorbent powders. Accordingly, for efficient molecular sieving, size of micro-pores as well as uniformity thereof are important. In the present invention, polymer structure precipitated out of its solution is found to provide desirable substrate for formation of such micro-pores.

According to the present invention, there is also provided a process for producing the molecular sieving particle as mentioned above. The process of the present invention comprises dispersing adsorbent powders into a polymeric material solution dissolved in a solvent, then dispersing the thus prepared dispersion to form fine droplets into a vehicle substantially immiscible with the solvent and having a boiling point higher than that of the solvent and finally removing the solvent by evaporation.

According to one preferred embodiment of the process of the present invention, a solvent substantially immiscible with water having lower boiling point and higher vapor pressure than water, a polymeric material soluble in said solvent and a vehicle of an aqueous solution of a surfactant or a hydrophilic protective colloid are used (Method A). According to another preferred embodiment of the present invention, a mixture of water with an organic solvent substantially immiscible with liquid paraffin or silicone oil and miscible with water having lower boiling point and higher vapor pressure than water, a polymeric material soluble in said solvent and a vehicle of liquid paraffin or silicone oil are used (Method B). In the following, each method is described in detail.

I. Method A

The solvents substantially immiscible with water refer to the solvents which are completely immiscible with water or miscible with at most about 15 % of water. They should have lower boiling point and higher vapor pressure than water. Examples are ethyl ether, isopropyl ether, methylene chloride, ethylene chloride, chloroform, carbon tetrachloride, benzene, cyclohexane, n-hexane, methyl acetate, and ethyl acetate. These solvents may be used alone or in mixtures. By the use of a mixed solvent, size of micro-pores of the polymer matrix can be varied, thereby controlling the molecular sieving effect of the product.

As polymeric material soluble in the aforesaid solvents, any polymer which does not deactivate adsorbent powders may be useable. Examples are ethyl cellulose, cellulose acetate, hydroxypropyl methyl cellulose phthalate, polyvinyl formal, polyvinyl butyral, polyvinyl acetal diethylamino acetate, polyester, polystyrene, vinyl chloride-vinyl acetate copolymer, vinyl chloride-vinyl propionate copolymer, and phenyl siloxane ladder polymer. Ethyl cellulose, cellulose acetate and polyvinyl formal are particularly preferred with respect to water permeability and mechanical strength.

As a vehicle, there is used an aqueous solution of a surfactant or a hydrophilic protective colloid which can hold stably the droplets of the dispersion, wherein adsorbent powders are dispersed in polymer solution, and does not deactivate said adsorbent powders. An aqueous solution of an surfactant which may be used contains 0.01 to 5 %, preferably, 0.25 to 2 % of anionic surfactants, for example, alkyl benzene sulfonates such as Newlex R, Newlex C-l or Newlex paste H, sulfonated alkyl esters of organic dibasic acids such as Lapizol B and sodium salt of sulfuric acid ester of higher alcohols such as Syntolex. An aqueous solution of a hydrophilic protective colloid, contains 0.05 to 5 %, preferably 1 to 2 % of sodium carboxymethyl cellulose, hydroxypropyl cellulose, methyl cellulose, hydroxypropyl methyl cellulose or polyvinyl alcohol. Furthermore, these surfactants and hydrophilic protective colloids may be used in combination.

In practising this method, the polymeric material is first dissolved in the solvent. The concentration of the polymeric material is variable depending on the polymeric material or the solvent employed. If the concentration is too high, dispersibility of adsorbents is poor. On the contrary, if the concentration is too low, droplets dispersed in the vehicle are instable and it takes long time for removal of the solvent. Accordingly, the concentration is usually between 0.5 and 20 %, preferably between 2 and 10 %. Furthermore, into the solvent or the polymeric material solution may be added suspension powders such as talc, silicon dioxide, starch, titanium dioxide magnesium carbonate or aluminum hydroxide in order to form stable droplets when the polymer solution is dispersed into the vehicle.

As the next step, adsorbent powders are dispersed in the polymer solution. The amount of adsorbent powders is about 5 % or more, preferably from about 40 to 85 % of the molecular sieving agent obtained. This dispersion is dispersed into a vehicle coming to fine droplets. The amount of the vehicle used is twice, preferably from three to seven times, as much as the polymer solution. Stirring conditions for effecting dispersion in fine droplets depend on the polymeric material employed, the concentration of the polymeric material contained in the dispersed droplets, the amount of the adsorbent, the amount of the vehicle and the particle size of the title products. Finally, the dispersion in fine droplets is, under stirring, left to stand at room temperature, heated or brought to reduced pressure to remove the solvent, whereby polymer matrix enclosing adsorbent powders is precipitated to produce the molecular sieving particles of the present invention, which are then recovered, washed and dried.

Method B

The solvents useable in admixture with water in this method are substantially immiscible with liquid paraffin or silicone oil which is used as vehicle, miscible with water, and have lower boiling points and higher vapor pressure than water. Examples are acetone, methyl ethyl ketone, methanol, ethanol and propanol. Among these, acetone and methanol are preferred because they can easily dissolve the polymeric materials as set forth below, even in admixture with water, and have boiling points by far lower than water. The content of water in said solvent may be within the range such that no precipitation of polymeric material is caused, preferably the maximum of said range. The suitable content of water to be admixed with the solvent depends on the combination of the solvent and the polymeric material employed as well as the concentration thereof. However, when the concentration of the polymeric material is within the suitable range, namely between 5 and 10 W/V %, water content between 2 V/V % and 20 V/V % is desirable. Particularly, water-containing acetone with water content of 7 to 15 V/V % and water-containing methanol with water content of 3 to 10 V/V % are preferably used. Furthermore, when the concentration of the polymeric material is low, the amount of water may be increased. On the contrary, when the concentration of the polymeric material is high, the amount of water may be decreased. The amount of water may also otherwise be controlled according to the occasion.

The polymeric material useable in this method is easily soluble in the above organic solvent, preferably easily soluble in water-containing organic solvent. Examples are cellulose acetate, cellulose acetate phthalate, cellulose acetate dibutylaminohydroxypropyl ether, hydroxypropyl methyl cellulosephthalate, cellulose butyrate, cellulose propionate, ethyl cellulose, hydroxypropyl methyl cellulose trimellitate, vinyl chloride-vinyl propionate copolymer, vinyl acetate-vinyl chloride copolymer, polyvinyl acetal diethylaminoacetate, styrene-maleic acid-ethylene copolymer, ethylene-vinyl acetate copolymer and acrylic acid-methacrylic acid copolymer. These polymers are dissolved in the above organic solvents. The concentration of the polymeric material is suitably between 5 and 10 W/V % for the same reasons as mentioned in the description of method A. Then, suitable amount of water as described above is added to the solution. Alternatively, the polymeric material may be dissolved directly in water-containing organic solvent.

Adsorbent powders are dispersed in the polymer solution desirably in amounts between 50 and 80 W/W % based on the molecular sieving agents to be obtained. If the amount is too small, adsorption capacity per unit weight of the molecular sieving particle is too poor. On the other hand, if the amount is too much, molecular sieving particles obtained are brittle.

As vehicle, liquid paraffins such as fluid paraffin, paraffins of Japanese pharmacopeia, or halogenated paraffins or silicone oils such as methyl silicone oil, phenyl silicone oil or methyl phenyl silicone oil may be used. These vehicles are high in viscosity and inert in nature. The above organic solvent solution dispersing therein adsorbent powders is dispersed in emulsions under stirring. Suspension stabilizers which do not deactivate adsorption capacity of adsorbent may be added to effect favorable dispersion. The amount of vehicle is suitably between 4 and 15 times the amount of the organic solvent solution. If the amount is too small, the emulsified droplets cohere each other to form agglomerates. On the other hand, if it is too large, recovery of molecular sieving agents is complicated. Molecular sieving agents are recovered according to the procedure as described in the description of method A.

According to each method as described above, molecular sieving particles with a size from 0.3 mm to 2.0 mm excellent in molecular sieving effect as well as in high adsorption capacity can easily be obtained. In each method, the combination of the solvent, polymeric material and the vehicle is critical for formation of micro-pores in the matrix precipitated polymer.

The molecular sieving particle of the present invention are found to exhibit unique molecular sieving effect. That is, the molecular sieving particle is capable of adsorbing selectively organic compounds according to the molecular weight thereof. The range of size of micro-pores formed in the matrix are estimated to be 8 to 40 A. Therefore, in the molecular sieving particle of the present invention, selective adsorption between high molecular weight organic compounds is also possible, as different from the molecular sieving particle of prior art. Furthermore, various molecular sieving particle having various molecular sieving effect can be prepared easily according to the process of the present invention. Thus, the molecular weight of adsorptive organic compounds is 1,280 or less and that of non-adsorptive organic compound is 5,700 or more in one example, while the molecular weight of adsorptive organic compounds is 10,000 or less and that of non-adsorptive organic compounds is 22,000 or more in another.

The molecular sieving particle of the present invention can be utilized in diversity of uses, by making avail of the aforesaid unique molecular sieving effect and excellent adsorption capacity. For example, efficient direct collection of various fermented products from various culture liquids, separation of antibiotics adsorbed into serum, purification of crude organic compounds, efficient collection of useful organic compounds from natural products, recovery of useful organic compounds from wasted liquids with simultaneous decoloration of said waste liquid, etc. may be mentioned.

The present invention is further explained by referring to the following Examples, which are shown merely for illustrative purpose.

Example 1

Various molecular sieving particles containing adsorbents are prepared according to Method A of the present invention by the use of the following recipes. In each sample, a wall material is first dissolved in a solvent. Activated carbon is dispersed into the thus prepared solution. The dispersion is added at room temperature under stirring into an aqueous solution having a surfactant or hydrophilic protective colloid dissolved therein. Stirring is further continued until the solvent is evaporated to form particles wherein adsorbent is enclosed in semi-permeable membrane of solid state, gelled polymer. The particles are separated by filtration, further washed several times with water and dried at 40°C in air stream to obtain molecular sieving particles having molecular sieving effect.

| | | |
|---|---|---|
| (a) | Adsorbent | : Kyoryoku Shirasagi (trade name: product of Takeda Chemical Industries), 90 g |
| | Wall polymer | : Ethyl cellulose (50 cps), 30 g |
| | Solvent | : Methylene chloride, 1200 ml |
| | Vehicle | : Aqueous solution containing 30 g of sodium lauryl benzene sulfonate, 6000 ml |
| | Product | : 112 g, sizes from 0.25 to 1.5 mm |
| (b) | Adsorbent | : Kyoryoku Shirasagi, 60 g |
| | Wall polymer | : Cellulose acetate, 40 g |
| | Solvent | : Methylene chloride, 1400 ml |
| | Vehicle | : Aqueous solution containing 30 g of sodium lauryl benzene sulfonate, 6000 ml |
| | Product | : 114 g, sizes from 0.25 to 1.5 mm |
| (c) | Adsorbent | : Kyoryoku Shirasagi, 90 g |
| | Wall polymer | : Polyvinyl formal, 30 g |
| | Solvent | : Methylene chloride, 1200 ml |
| | Vehicle | : Aqueous solution containing 30 g of sodium lauryl benzene sulfonate, 6000 ml |
| | Product | : 109 g, sizes from 0.25 to 1.5 mm |
| (d) | Adsorbent | : Kintsuru (trade name; activated charcoal for use in brewing; Aokikogyo Co.), 30 g |
| | Wall polymer | : Vinyl chloride-vinyl acetate copolymer, 20 g |
| | Solvent | : Chloroform, 700 ml |
| | Vehicle | : Aqueous solution containing 0.5 % polyvinyl alcohol, 4000 ml |
| | Product | : 45 g, sizes from 0.2 to 1.7 mm |
| (e) | Adsorbent | : Shirasagi A (trade name), 8 g |
| | Wall polymer | : Polyvinyl butyral, 2 g |
| | Solvent | : Methylene chloride, 100 ml |
| | Vehicle | : Aqueous solution containing 0.5 % sodium lauryl benzene sulfonate, 800 ml |
| | Product | : 8 g, sizes from 0.2 to 1.7 mm |
| (f) | Adsorbent | : Kyoryoku Shirasagi, 60 g |
| | Wall polymer | : Ethyl cellulose (50 cps), 40 g |
| | Solvent | : Methylene chloride, 1000 ml |
| | Vehicle | : Aqueous solution (6,000 ml) containing 12 g of hydroxypropyl cellulose (HPC: trade name, product of Shinetsu Kagaku Co.) and 30 g sodium lauryl benzene sulfonate |
| | Product | : 99 g, sizes from 0.25 to 1.5 mm |

Example 2

According to Method B of the present invention, various molecular sieving particles containing adsorbents are prepared under the conditions as set forth below. In each sample, a wall material is first dissolved in a water-containing solvent. An adsorbent is dispersed homogeneously in the thus prepared solution. The dispersion is dispersed into a vehicle to form emulsions under stirring. Stirring is continued until the solvent is evaporated to form molecular sieving particles. The molecular sieving particles are washed, dried and further subjected to washing and drying.

| | | |
|---|---|---|
| (g) | Adsorbent | : Activated charcoal (Kyoryoku Shirasagi), 225 g |
| | Wall polymer | : Cellulose acetate, 150 g |
| | Solvent | : 13 % water containing acetone, 350 ml |

-continued

| | | |
|---|---|---|
| | Vehicle | : Liquid paraffin (9000 ml) of Japanese Industrial Standard No.4) having 180 g of Lanex (trade name; product of Kuroda Nippon Co.) dissolved therein |
| | Stirring condition | : Sizes of emulsion droplets, 0.6 to 1.5 mm, 4 hours stirring |
| | Washed and drying | : washed several times with n-hexane, dried, and then boiled in 500 ml of 1 N caustic soda for 20 minutes, followed by washing with water and drying |
| | Product | : 380 g, sizes from 0.6 to 1.5 mm |
| (h) | Adsorbent | : Activated charcoal (Kyoryoku Shirasagi) 30 g |
| | Wall polymer | : Stylite CM-2L (trade name; product of Daido Co.), 20 g |
| | Solvent | : 10 % water-containing methanol, 500 ml |
| | Vehicle | : Liquid paraffin of Japanese Pharmacopeia (1500 ml) containing 7.5 g of a surfactant (MAA-48: trade name; product of Nihon Yushi Co.) |
| | Stirring condition | : Propeller stirring, 300 r.p.m.; sizes of emulsion droplets, 0.6 to 1.0 mm; 9 hours stirring |
| | Washing and drying | : Washed with n-hexane, dried in air and then boiled in 500 ml of an aqueous solution containing 20 % alcohol for 20 minutes, followed by washing with water for 3 to 4 times and drying |
| | Product | : Sizes from 0.6 to 1.0 mm |
| (i) | Adsorbent | : Activated charcoal (Kyoryoku Shirasagi) 6 g |
| | Wall polymer | : CABP-Wako (trade name; product of Wako Junyaku Kogyo Co.), 4g |
| | Solvent | : Dissolved in acetone (100 ml) followed by addition of water (10 ml) |
| | Vehicle | : Silicone oil (300 ml) (KF-96: trade name, product of Shinetsu Kagaku Kogyo Co.) dissolving 1.5 g of MAA-48 |
| | Stirring condition | : 500 r.p.m.; sizes of emulsion droplets from 0.5 to 0.8 mm; 4 hours stirring |
| | Washing and drying | : Same as in sample (g) |
| | Product | : Sizes from 0.5 to 0.8 mm |
| (j) | Absorbent | : Activated charcoal (Kyoryoku Shirasagi), 12 g |
| | Wall polymer | : Vinyl chloride-vinyl acetate copolymer (product of Shinetsu Kagaku Kogyo Co.), 8 g |
| | Solvent | : Dissolved in acetone (92 ml) followed by addition of water (8 ml) |
| | Vehicle | : Liquid paraffin of Japanese Pharmacopeia (800 ml) dissolving 8 g of Squalan (trade name; product of Yamada store) |
| | Stirring condition | : 400 r.p.m.; sizes of emulsion droplets from 0.3 to 0.8 mm; 6 hours stirring |
| | Washing and drying | : Same as in sample (h) |
| | Product | : Sizes from 0.3 to 0.8 mm |
| (k) | Adsorbent | : Activated charcoal (Kyoryoku Shirasagi), 18 g |
| | Wall polymer | : Ethyl cellulose (product of Wako Junyaku Kogyo Co.), 16g |
| | Solvent | : Dissolved in acetone (300 ml) followed by addition of water (30 ml) |
| | Vehicle | : Silicone oil (KF-96: trade name), 1200 ml, dissolving 6 g of MAA-48 (trade name) |
| | Stirring condition | : 380 r.p.m.; 4 hours stirring, while the temperature being gradually raised up to 45°C |
| | Washing and drying | : Same as in sample (g) |
| | Product | : Sizes from 0.7 to 1.2 mm |
| (l) | Adsorbent | : Activated charcoal (Kyoryoku Shirasagi), 18 g |
| | Wall polymer | : Polyvinyl butyral (N 4000: trade name; product of Wako Junyaku Kogyo Co.), 12 g |
| | Solvent | : 6 % water-containing methanol, 150 ml |
| | Vehicle | : Liquid paraffin of Japanese Pharmacopeia (800 ml) dissolving 8 g of Gafak LS-500 (trade name: Toho Kagaku Kogyo Co.) |
| | Stirring condition, washing and drying are same as in sample (k). | |
| | Product | : Sizes from 0.5 to 1.0 mm |
| (m) | Adsorbent | : Powders of Amberlite CG-50 (trade name; product of Rohm & Haas Co.), 6 g |
| | Wall polymer | : Cellulose acetate, 4 g |
| | Solvent | : 10 % water-containing acetone |
| | Vehicle | : Liquid paraffin of Japanese Pharmacopeia (800 ml) dissolving 8 g of Gafak LS-500 |
| | Stirring condition | : 400 r.p.m. |
| | Washing and drying | : Same as in sample (g) |
| | Product | : Sizes from 0.5 to 1.5 mm |
| (n) | Adsorbent | : Powders of Amberlite CG-50, 6 g |
| | Wall polymer | : Ethyl cellulose, 4 g |
| | Solvent | : 10 % water-containing acetone, 100 ml |
| | Vehicle | : Liquid paraffin of Japanese Pharmacopeia |

-continued

|     |                     |                                                              |
|-----|---------------------|--------------------------------------------------------------|
|     |                     | (300 ml) dissolving 1.5 g of Lanex                           |
|     | Stirring condition  | : 4 hours stirring                                           |
|     | Washing and drying  | : same as in sample (g)                                      |
|     | Product             | : Sizes from 0.3 to 1.0 mm                                   |
| (o) | Adsorbent           | : Active alumina (product of Wako Junyaku Kogyo Co.), 6 g    |
|     | Wall polymer        | : Cellulose acetate, 4 g                                     |
|     | Solvent             | : 15 % water-containing acetone, 100 ml                      |
|     | Vehicle             | : Silicone oil (KF-96) (300 ml) dissolving 3 g of Gafak LS-500 |
|     | Stirring condition  | : 350 r.p.m.                                                 |
|     | Product             | : Sizes from 0.3 to 0.6 mm                                   |
| (p) | Adsorbent           | : Powders of Amberlite CG-50, 6 g                            |
|     | Wall polymer        | : Cellulose acetate, 4 g                                     |
|     | Solvent             | : 15 % water-containing acetone, 100 ml                      |
|     | Vehicle             | : Liquid paraffin of Japanese Pharmacopeia containing 0.5 % Lanex |
|     | Stirring condition  | : 350 r.p.m.                                                 |
|     | Product             | : Sizes from 0.3 to 0.6 mm                                   |

Comparative example

For comparative purpose, microcapsules devoid of micro-pores through wall film are prepared in the same manner as described in Example 2 except that dry acetone is used as solvent. Namely, in samples (q) and (r), dry acetone is prepared by adding 30 g of calcium chloride to 100 ml of a commercially available acetone, allowing it to stand overnight and removing the drying agent by filtration.

|     |                     |                                                              |
|-----|---------------------|--------------------------------------------------------------|
| (q) | Adsorbent           | : Active alumina, 6 g                                        |
|     | Wall polymer        | : Cellulose acetate, 4 g                                     |
|     | Solvent             | : Dry acetone, 100 ml                                        |
|     | Vehicle             | : Silicon oil (KF-96) containing 3 g of Gafak LS-500, 300 ml |
|     | Stirring condition  | : 350 r.p.m.                                                 |
|     | Washing and drying  | : Same as in sample (g)                                      |
|     | Product             | : Sizes from 0.35 to 0.8 mm                                  |
| (r) | Adsorbent           | : Powders of Amberlite CG-50, 6 g                            |
|     | Wall polymer        | : Cellulose acetate, 4 g                                     |
|     | Solvent             | : Dry acetone, 100 ml                                        |
|     | Vehicle             | : Liquid paraffin of Japanese Pharmacopeia containing 0.5 % Lanex, 300 ml |
|     | Stirring condition  | : 350 r.p.m.                                                 |
|     | Product             | : Sizes from 0.35 to 0.8 mm                                  |

Example 3

Adsorption capacity of samples (a), (b) and (c) obtained in Example 1 and several Controls is tested. As a substrate, 0.01% aqueous solution of Methylene Blue (M.W.=374) is used. To this solution was added each sample or Control equivalent to one gram of adsorbent, followed by agitation. After the mixture is left to stand for 24 hours, molecular sieving particles are removed by filtration. Absorbance of the filtrate at the wavelength of 595 $\mu$ ($OD_{595\,\mu}$) is measured by a spectrophotometer. The results are shown in Table 1.

Table 1

|                                                                                                            | Absorbance* | Adsorption degree** |
|------------------------------------------------------------------------------------------------------------|-------------|---------------------|
| Control 1 (Untreated active carbon: Kyoryoku Shirasaki: trade name; product of Takeda Chemical Industries) | 0           | 100                 |
| Sample (a)                                                                                                 | 0.542       | 90                  |
| Sample (b)                                                                                                 | 0.320       | 94                  |
| Sample (c)                                                                                                 | 0.648       | 88                  |
| Control 2 (commercially available active carbon granules, Adoster B1-L; product of Ados Kasei Co.)         | 1.900       | 65                  |
| Control 3 (commercially available active carbon granules, Adoster-P5-L; product of Ados Kasei Co.)         | 1.850       | 66                  |

*Absorbance of substrate : 5.440

$$**\text{Adsorption degree} = \frac{(\text{Absorbance of substrate}) - (\text{Absorbance of filtrate})}{(\text{Absorbance of substrate})} \times 100\ (\%)$$

Example 4

Adsorption ability of samples (g), (h), (i) and (k) obtained in Example 2 and several Controls is tested similarly as in Example 3. The results are set forth in Table 2.

Table 2

|  | Absorbance* | Adsorption degree** |
| --- | --- | --- |
| Control 1 | 0 | 100 |
| Sample (g) | 0.520 | 89 |
| Sample (h) | 1.310 | 72 |
| Sample (i) | 0.642 | 87 |
| Sample (k) | 0.635 | 93 |
| Control 2 | 2.210 | 56 |
| Control 4 (commercially available active carbon granules produced by Institute of Industrial Technology, Japan) | 2.950 | 41 |
| Control 5 (commercially available active carbon granules large produced by Takeda Chemical Industries) | 3.550 | 29 |

*Absorbance of substrate: 5.000
**See the definition in Table 1.

Example 5

Adsorption ability for riboflavin of sample (o) obtained in Example 2, alumina powders (Control 6) and sample (q) obtained in Comparative example (Control 7) is tested. Each sample is added in an amount corresponding to 1 g of alumina content to an aqueous riboflavin solution ($OD_{450\,\mu} = 0.885$). Each mixture is allowed to stand for 24 hours and thereafter the adsorbent is removed by filtration. Absorbance of the filtrate at the wavelength of 450 $\mu$ is measured. The results are shown in Table 3, wherein adsorption degree is as defined in Table 1.

Table 3

|  | Absorbance | Adsorption degree |
| --- | --- | --- |
| Sample (o) | 0.186 | 79 |
| Control 6 | 0.216 | 76 |
| Control 7 | 0.900 | 0 |

Example 6

Adsorption capacity of sample (p) obtained in Example 2, powders Amberlite CG-50 (Control 8) and sample (r) obtained in Comparative example (Control 9) is tested in the same manner as in Example 3 by using as substrate an aqueous Methylene Blue solution ($OD_{595\,\mu}$ : 5.500). The results are shown in Table 4, wherein adsorption degree is as defined in Table 1.

Table 4

|  | Absorbance | Adsorption degree |
| --- | --- | --- |
| Sample (p) | 0.950 | 83 |
| Control 8 | 0.230 | 96 |
| Control 9 | 3.275 | 40 |

Example 7

Molecular sieving effect of samples (a), (b) and (f) in Example and samples (g) through (n) in Example 2 is tested. Various organic compounds having different molecular weights are used for this test. These compounds show about 100 % adsorption degree when they are treated with unmodified activated charcoal or Amberlite CG-50. EAch molecular sieving agent is packed in a column of 1 cm in diameter in an amount corresponding to 1 g of adsorbent content. The aforesaid organic compound, dissolved in 10 ml of water, are passed through the column at the flow rate of 0.5 ml/minute. The column is washed thoroughly with water and then subjected to elution. By means of a fraction collector, every 5 ml of eluate is collected. For organic compound A, absorbance at 595 $\mu$, and for organic compounds B through L, absorbances at 280 $\mu$ are measured, respectively. The sum of absorbances multiplied by volume of eluate fraction is compared with the absorbance of the organic compound solution charged, to determine the degree of elution, from which absorption degree is calculated.

Table 5

| Organic compound | Molecular weight | Concentration mg/ml | Sample: Adsorption degree (%) | | | | | | | | | | | |
| --- | --- | --- | --- | --- | --- | --- | --- | --- | --- | --- | --- | --- | --- | --- |
|  |  |  | (a) | (b) | (c) | (f) | (g) | (h) | (i) | (j) | (k) | (l) | (m) | (n) |
| A. Mythylene Blue | 374 | 5 | 100 | 100 | 100 | 100 | — | — | — | — | — | — | — | — |
|  |  | 1 | — | — | — | — | 100 | 100 | 100 | 100 | 100 | 100 | 100 | 100 |
| B. Tuberactinomycin | 798 | 10 | 100 | 100 | 100 | 100 | — | — | — | — | — | — | — | — |
|  |  | 15 | — | — | — | — | 100 | 80 | 100 | 64 | 51 | 97 | 100 | 100 |
| C. Polymyxin | 1,280 | 0.5 | 100 | 100 | 100 | 100 | — | — | — | — | — | — | — | — |
| D. Insulin | 5,700 | 5 | 100 | 100 | 98 | 100 | — | — | — | — | — | — | — | — |
| E. Egg white lysczyme | 14,000 | 2.5 | 96 | 90 | 92 | 95 | — | — | — | — | — | — | — | — |
|  |  | 15 | — | — | — | — | 100 | 1 | 39 | 6 | 0 | 32 | 26 | 44 |
| F. α-Chymotrypcin | 24,500 | 10 | 62 | 52 | 72 | 63 | — | — | — | — | — | — | — | — |
|  |  | 15 | — | — | — | — | 92 | 0 | 5 | 0 | 0 | 0 | 8 | 17 |
| G. Semi-alkali protease | 30,000 | 10 | 20 | 25 | 21 | 25 | — | — | — | — | — | — | — | — |
|  |  | 15 | — | — | — | — | 75 | 0 | 0 | 0 | 0 | 0 | 0 | 0 |
| H. Pepsin | 35,000 | 15 | — | — | — | — | 0 | 0 | 0 | 0 | 0 | 0 | 0 | 0 |
| I. Egg white albumin | 45,000 | 10 | 0 | 9 | 6 | 0 | — | — | — | — | — | — | — | — |
|  |  | 15 | — | — | — | — | 0 | 0 | 0 | 0 | 0 | 0 | 0 | 0 |
| J. Serum albumin | 67,000 | 10 | 0 | 0 | 0 | 0 | — | — | — | — | — | — | — | — |
|  |  | 15 | — | — | — | — | 0 | 0 | 0 | 0 | 0 | 0 | 0 | 0 |
| K. γ-Globulin | 156,000 | 10 | 0 | 0 | 0 | 0 | — | — | — | — | — | — | — | — |
|  |  | 15 | — | — | — | — | 0 | 0 | 0 | 0 | 0 | 0 | 0 | 0 |
| L. Urease | 480,000 | 10 | 0 | 0 | 0 | 0 | — | — | — | — | — | — | — | — |

The following examples are given to show that the molecular sieving particle of the present invention is applicable in diversity of uses.

Example 8

Simulated kanamycin culture liquid is prepared by adding 80 mg of kanamycin sulfate to 160 ml of glucose-bouillon medium which is sterilized by heating at 120°C for 15 minutes. This liquid is then passed through a column (diameter: 1.5 cm), wherein 2.7 g of the molecular sieving particle containing activated charcoal obtained in Example 1 (sample (a)) is packed, at a flow rate of 0.5 ml/minute. The column is then subjected to washing with water and further to elution with 0.1N HCl-methanol (1:1) solvent. Active fractions are combined and 72.8 mg of kanamycin chloride is recovered in very high purity (decoloration degree: 99%; purity: 98%) and high yield (recovery percentage: 91%).

Example 9

Into 500 ml Sakaguchi's flasks is apportioned each 100 ml of a medium containing 1 % starch, 1 % washed molasses, 1 % peptone and 1 % meat extract. Each medium is sterilized at 120°C for 30 minutes. Into each medium is innoculated Streptomyces glizeobarchsiratus parietus tuberaceticus No. 6-130 (Deposit No. 619 at Institute of Fermentation Research, Japan) and culturing is effected at 30°C for 2 days by means of a reciprocating shaking culturing machine with 7 cm of amplitude and 130 strokes/minute. Four hundred (400) ml of this liquid is transferred aseptically into a medium which is prepared by adding 5 ml of a defoaming agent (Uniol-D-2000; trade name; of Nihon Yushi Co.) to 20 liter of a medium containing 1 % starch, 1 % wasted molasses, 1 % peptone and 1 % meat extract and sterilizing said medium in a 30 l jar fermenter at 120°C for 30 minutes. Culturing is continued at 30°C for 92 hours, and under aeration of sterilized air at the rate of 20 l/minute, with stirring at the rate of 200 r.p.m. to obtain 19 liter of a culture liquid containing 2260 mg/ml of Tuberactinomycin-N. Solid components are then removed from this liquid. Fifty (50) ml of the clear liquid obtained is treated with a column of 1 cm in diameter packed with 3 g of the molecular sieving particle containing activated charcoal obtained in Example 1 (sample (a)), followed by washing with water and elution with 0.1 N hydrochloric acid. The eluate obtained contains Tuberactinomycin-N hydrochloride without elution of colored substances. This eluate, after neutralization with sodium hydroxide, is concentrated under reduced pressure, while removing sodium chloride precipitated by filtration, until the concentrate is reduced to 2 ml. To the concentrate is added 14 ml of methanol. The precipitates formed after standing overnight at 5°C are collected by filtration, washed with methanol and thereafter dried under reduced pressure to obtain 79.7 mg of crude Tuberactinomycin-N hydrochloride (Yield: 67 %; Purity: 95 %).

Example 10

Ten (10) mg of alkali phosphatase (M.W.=100,000) is dissolved in 10 ml of a 10 % aqueous crystal violet solution (Absorbance at 590 $\mu$: 5.1) The solution obtained is passed through a column of 1 cm in diameter packed with 4 g of the molecular sieving particle containing activated charcoal obtained in Example 1 (sample (a)) at the rate of 0.5 ml/minute. Decoloration degree of the effluent obtained is as high as 99 %. Furthermore, when 0.5 ml of said effluent is added to a mixture containing 0.2 ml of 0.02 mole para-nitro phenyl phosphate, 1 ml of 0.1 mol boric acid buffer solution and 0.3 ml of water and allowed to react at 37°C for 10 minutes, followed by addition of 1 ml of 0.5 N caustic soda, a solution containing 9.7 mg (recovery percentage 97%) of alkali phosphatase is found to be obtained as measured by the absorbance at 420 m$\mu$.

Example 11

Simulated serum kanamycin solution is prepared by dissolving 50 mg of kanamycin, 1 g of $\gamma$-globulin and 1 g of serum alubumin in 10 ml of isotonic sodium chloride solution. Then, the solution is passed through a column of 1.5 cm in diameter packed with 2.5 g of the molecular sieving agent containing active carbon obtained in Example 1 (sample (C)) at the rate of 0.5 ml/minute, followed by washing with water and elution, 5 ml per each fraction, with 0.01 N HCl-methanol (1:1). The fractions 2 to 35 are combined to obtain 46 mg of kanamycin (yield: 92 %).

Example 12

Methylene Blue (0.2 mg) is dissolved in 20 ml of 0.05 mol tris buffer solution (pH 7.5), then 100 mg of egg white lysozyme and 500 mg of egg white alubumin are dissolved therein to prepare a solution. The solution is passed through a column of 1.5 cm in diameter packed with 2.5 g of the molecular sieving particle containing active carbon obtained in Example 1 (sample (a)) at the rate of 0.5 ml/minute to obtain an effluent. To the effluent is added Micrococcus raizodicticcus ATCC 4698 strain to measure the decrease in turbidity by bacteriorysis at 540 m$\mu$. It is found that about 90 mg of egg white lysozyme is present in said liquid. The effluent is further passed through a column of 1.5 cm in diameter packed with 10 g of the molecular sieving particle containing active carbon obtained in Example 1 (sample (b)) at the rate of 0.5 ml/minute to obtain an effluent containing only egg white alubumin from which lysozyme is removed by adsorption. This effluent shows no activity of egg white lysozyme as mentioned above and absorbance measured at 280 m$\mu$ corresponds to 470 mg of egg white alubumin content.

Example 13

An aqueous egg white solution model is prepared by dissolving 5 mg of egg white alubumin and 5 mg of egg white lysozyme in 10 ml of water (egg white alubumin: $OD_{280\ m\mu}$ : 2.74; egg white lysozyme: $OD_{280\ m\mu}$ = 10.14). The aqueous egg white solution model is passed through a column of 1 cm in diameter packed with 1.67 g of the molecular sieving particle containing activated charcoal obtained in Example 1 (sample (f)) at the rate of 0.5 ml/minute. Said column is then treated with distilled water. The effluent is recovered in fractions, 5 ml per each fraction. Ten fractions are recovered and combined. Absorbance of 1 ml fraction from the combined liquid is measured at 280 m$\mu$ to be 0.055. Accordingly, the total absorbance of the effluent is 2.75, indicating that 100 % of the egg white alubumin used is contained in the effluent. Furthermore, said column is subjected to elution with 0.1 N hydrochloric acid. Ten fractions, 5 ml per each, are recovered and combined. Absorbance of 1 ml fraction from the combined liquid is measured at 280 m$\mu$ to be 0.211. Accordingly, the total absorbance of the eluate is 10.55, indicating that 100 % of the egg white lysozyme is contained in the eluate. The effluent and the eluate are lyophilized to collect egg white alubumin and egg white lysozyme.

The method as described above is capable of separating and recovering egg white alubumin and egg white lysozyme from the aqueous egg white solution model in extremely high yield. Furthermore, this method is also suitable for collection of egg white lysozyme and others from egg white.

What we claim is:

1. A molecular sieving particle comprising adsorbent powders which are dispersed in a micro-porous matrix of a polymer selected from the group consisting of ethyl cellulose, cellulose acetate, hydroxypropyl methyl cellulose phthalate, polyvinyl formal, polyvinyl butyral, polyvinyl acetal diethylamino acetate, polystyrene, vinyl chloride-vinyl acetate copolymer, vinyl chloride-vinyl propionate copolymer, phenyl siloxane ladder polymer, cellulose acetate phthalate, cellulose acetate dibutylaminohydroxypropyl ether, cellulose butyrate, cellulose propionate, hydroxypropyl methyl cellulose trimellitate, polyvinyl acetal diethylaminoacetate, styrene-maleic acid-ethylene copolymer, ethylene-vinyl acetate copolymer and acrylic acid-methacrylic acid copolymer, having a molecular sieving micro-porous structure, said molecular sieving particle having a size from 0.3 mm to 2.0 mm and micro-pores in said polymer matrix having a size in the range of from 8 to 40 A, the amount of said adsorbent powders being from 5 to 85% of the molecular sieving particle.

2. The molecular sieving particle of claim 1, wherein said adsorbent powders are powders of activated carbon alumina, silica gel, celite, bentonite, ion-exchange resin, or calcium phosphate gel.

3. A process for producing a molecular sieving particle having adsorbent powders dispersed in a micro-porous matrix of a polymer selected from the group consisting of ethyl cellulose, cellulose acetate, hydroxy propyl methyl cellulose phthalate, polyvinyl formal, polyvinyl butyral, polyvinyl acetal diethylaminoacetate, polystyrene, vinyl chloride-vinyl acetate copolymer, vinyl chloride-vinyl propionate copolymer and phenyl siloxane ladder polymer, the matrix having pores with a size of from 8 to 40 A, which comprises dispersing adsorbent powders in a solution having from 0.5 to 20% of said polymer dissolved in a solvent which is substantially immiscible with water and has a lower boiling point and a higher vapor pressure than water, then emulsifying the thus prepared dispersion to form fine droplets into a vehicle which is an aqueous solution of surfactant containing 0.01 to 5% of an anionic surfactant selected from the group consisting of alkyl benzene sulfonates, sulfonated alkyl esters of organic dibasic acids and sodium salt of sulfuric acid ester of higher alcohols or an aqueous solution of a hydrophilic protective colloid containing 0.05 to 5% of a compound selected from the group consisting of sodium carboxymethyl cellulose, hydroxypropyl cellulose, methyl cellulose, hydroxypropyl methyl cellulose and polyvinyl alcohol, and removing the solvent by evaporation.

4. The process of claim 3, wherein said solvent is ethyl ether, isopropyl ether, methylene chloride, ethylene chloride, chloroform, carbon tetrachloride, benzene, cyclohexane, n-hexane, methyl acetate, ethyl acetate, or mixtures thereof.

5. The process of claim 3, wherein said adsorbent powders are powders of activated carbon, alumina, silica gel, celite, bentonite, ion-exchange resin or calcium phosphate gel.

6. The process of claim 3, wherein said molecular sieving particle has a size of from 0.3mm to 2.0mm.

7. The process of claim 3, wherein the amount of adsorbent particles dispersed within said matrix is from 5 to 85% of the molecular sieving particle.

8. The process of claim 7, wherein the amount of vehicle is 2 to 7 times as much as the amount of said solvent solution.

9. A process for producing a molecular sieving particle having adsorbent powders dispersed in a micro-porous matrix of a polymer selected from the group consisting of cellulose acetate, cellulose acetate phthalate, cellulose acetate dibutylaminohydroxypropyl ether, hydroxy methyl cellulose phthalate, cellulose butyrate, cellulose propionate, ethyl cellulose, hydroxypropyl methyl cellulose trimellitate, vinyl chloride-vinyl propionate copolymer, vinyl acetate-vinyl chloride copolymer, polyvinyl acetal diethylaminoacetate, styrene-maleic acid-ethylene copolymer, ethylene-vinyl acetate copolymer and acrylic acid-methacrylic acid copolymer, the matrix having pores with a size of from 8 to 40 A, which comprises dispersing adsorbent powders in a solution having from 5 to 10W/V % of said polymer dissolved in a mixture of water with an organic solvent which is substantially immiscible with liquid paraffin or silicone oil, immiscible with water and has a lower boiling point and a higher vapor pressure than water, said mixture containing water in an amount of from 2 to 20 V/V %, then emulsifying the thus prepared dispersion to form fine droplets into a vehicle which is liquid paraffin or silicone oil, and removing the solvent by evaporation.

10. The process of claim 9, wherein the solvent is acetone, methylethyl ketone, methanol, ethanol or propanol.

11. The process of claim 9, wherein the adsorbent powders are powders of activated carbon, alumina, silica gel, celite, bentonite, ion-exchange resin, or calcium phosphate gel.

12. The process of claim 9, wherein said molecular sieving particle has a size of from 0.3 mm to 2.0 mm.

13. The process of claim 9, wherein the amount of adsorbent particles dispersed in the polymer solution is between 50 to 80 W/W%, based on the molecular sieving particle.

14. The process of claim 13, wherein the amount of vehicle is 4 to 15 times the amount of organic solvent solution.

* * * * *